United States Patent [19]

Nishikawa et al.

[11] Patent Number: 4,637,278
[45] Date of Patent: Jan. 20, 1987

[54] GEAR SHIFT CONTROLLER FOR AUTOMATIC TRANSMISSION

[75] Inventors: Masao Nishikawa, Tokyo; Shinzo Sakai, Saitama; Yoshimi Sakurai, Tanashi, all of Japan

[73] Assignee: Honda Giken Kogyo Kabushiki Kaisha, Tokyo, Japan

[21] Appl. No.: 559,145

[22] Filed: Dec. 7, 1983

[30] Foreign Application Priority Data

Dec. 7, 1982 [JP] Japan .................................. 57-214503

[51] Int. Cl.$^4$ ............................................. B60K 41/06
[52] U.S. Cl. ..................................... 74/866; 74/864; 364/424.1
[58] Field of Search ......................... 74/864, 878, 866; 364/424.1

[56] References Cited

U.S. PATENT DOCUMENTS

| | | | |
|---|---|---|---|
| 3,675,511 | 7/1972 | Wakamatsu et al. | 74/866 |
| 3,684,066 | 8/1972 | Kubo et al. | 74/866 X |
| 3,707,097 | 12/1972 | Arai et al. | 74/866 |
| 3,726,157 | 4/1973 | Marumo | 74/864 X |
| 3,741,043 | 6/1973 | Oya et al. | 74/866 |
| 3,776,048 | 12/1973 | Enomoto et al. | 74/866 |
| 3,813,964 | 6/1974 | Ichimura et al. | 74/866 |
| 3,855,880 | 12/1974 | Ishimaru et al. | 74/866 X |
| 3,943,799 | 3/1976 | Sakai et al. | 74/866 |
| 4,034,627 | 7/1977 | Mizote | 74/866 |
| 4,262,335 | 4/1981 | Ahlen et al. | 364/424.1 X |
| 4,290,325 | 9/1981 | Nishimura | 74/878 X |
| 4,308,764 | 1/1982 | Kawamoto et al. | 74/866 X |
| 4,408,293 | 10/1983 | Avins | 364/424.1 X |
| 4,478,108 | 10/1984 | Nishimura et al. | 74/878 X |

Primary Examiner—Leslie A. Braun
Assistant Examiner—Dwight G. Diehl
Attorney, Agent, or Firm—Armstrong, Nikaido, Marmelstein & Kubovcik

[57] ABSTRACT

Disclosed is a gear shift controller for an automatic transmission with a gear shift, having a hydraulic torque converter; a gear change group, having a plurality of gears, each gear providing a different transmission ratio for the transmission of power from said hydraulic converter to the output of the transmission, each of said gears having a gear train; a one-way clutch interposed in at least one of said gear trains; a plurality of clutch means operatively connected with said gear trains for actuating each of said gear trains selectively; a gear change determination circuit operatively connected with said clutch means for controlling the operation of each of said clutch means according to a predetermined gear-shifting program; a coasting detection circuit operatively connected with said gear change determination circuit, for detecting a car in the coasting state; a gear shift limiting circuit, operatively connected with said gear change determination circuit, for actuating only said gear train in which said one-way clutch is interposed immediately regardless of the operation of said gear change determination circuit, when said coasting detection circuit has determined the car to be coasting; and an operation transfer control system for transferring the operation of the gear shift limiting circuit.

5 Claims, 7 Drawing Figures

GEAR SHIFT CONTROLLER FOR AUTOMATIC TRANSMISSION

BACKGROUND OF THE INVENTION

This invention relates to a gear shift controller for an automatic transmission with a one-way clutch interposed in at least one gear train of those which correspond to each of a plurality of change steps (hereinafter referred to as gears), which comprises actuating only the gear train in which the one-way clutch is interposed in an idling state regardless of normal gear shift operation.

In most cases, generally, where a car in top gear slows to adjust the distance between itself and another car or runs down a gentle downward slope, the driver lifts off the throttle to coast. In such a case, it is preferable that the transmission be in neutral to save fuel, an important concern among drivers today.

In a car operating with an automatic transmission, when it coasts in the D-range, or in top gear, the gear shift is kept, in most cases, at a top gear according to a control program set beforehand, and if so, fuel consumption can be saved somewhat by the sliding action of a torque converter. However, the engine is still idling, thus the fuel consumption cannot be optimized. Moreover, it is very troublesome to manually shift the transmission to the N-range or neutral gear whenever the car is coasting, thus destroying the essential convenience of the automatic transmission.

On the other hand, in a transmission with a top gear ratio which is an "overdrive" (that is, the ratio is less than 1) engine braking when in top gear is not very effective, and particularly in the case of a transmission with a torque converter, the effect is almost nil. However, in the case of a transmission with a torque converter, there is normally a gear having an engine braking effect one step lower than the top gear, therefore the particular gear can be used for engine braking. For a driver who wants to have engine braking at the time of gear shift on the top gear despite the minor effect of the engine braking, it is desirable that the engine braking be available at the time of the gear shift on the top gear as occasion demands.

SUMMARY OF THE INVENTION

In view of the above circumstances, a major object of this invention is to provide such a gear shift controller for an automatic transmission which is capable of saving fuel by braking an engine power system automatically through detecting a coasting state when a car is coasting.

Another object of this invention is to provide a gear shift controller for an automatic transmission which comprises interposing a one-way clutch in at least one gear train of those which correspond to each of a plurality of gears of the transmission, thus utilizing the one-way clutch for braking the engine power system during coasting.

Further object of this invention is to provide a gear shift controller for an automatic transmission whereby a car is capable of running in an engine braking state without braking engine power system, if the driver so desires.

Further object of this invention is to provide a gear shift controller for an automatic transmission which comprises utilizing a one-way clutch interposed in a change gear train of low gear or particularly the lowest gear for braking an engine power system, whereby the number of times for shifting the transmission can be minimized down to one, where possible, thus moderating a shock to be exerted on the passengers.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE INVENTION

Figure 1:
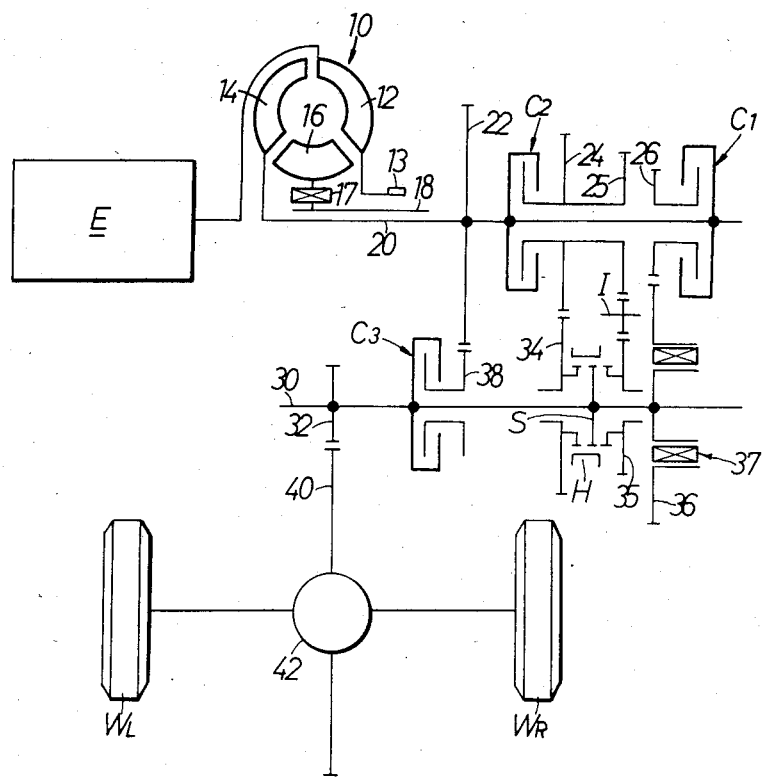
FIG. 1 is a schematic diagram of an engine power transmission system given in one embodiment of this invention.

The preferred embodiment of the instant invention will now be described with reference to the accompanying drawings. First in FIG. 1, power of an engine E is transmitted to pump wheel 12 of a hydraulic torque converter 10, the torque received by pump wheel 12 is transmitted hydraulically to turbihe wheel 14 through stator 16 and also transmitted to hydraulic pressure source pump 50 shown in FIG. 2 (described hereinafter) through a spline 13 on a hollow shaft running together with the pump wheel 12, thus driving the hydraulic pressure source pump 50. The stator 16 is coupled to stationary hollow shaft 18 through a one-way clutch 17, which is capable of running in the same direction only as the pump wheel 12 and the turbine wheel 14 according to an action of the one-way clutch 17, and when the torque is amplified in the torque converter 10, it bears a reaction force arising then.

A main shaft 20 running solidly with the turbine wheel 14 extends rearward through the hollow shaft 18, and a top speed driving gear or a third-speed driving gear 22, a clutch for intermediate-speed gear or a second-speed clutch $C_2$, and a clutch for minimum-speed gear or a first-speed clutch $C_I$ are fixed rearward in that order on the main shaft 20 in the rear of the torque converter 10. Then, a second-speed driving gear 24, a reverse driving gear 25 and a first-speed driving gear 26 are provided rotatably with the main shaft 20 between the second-speed clutch $C_2$ and the first-speed clutch $C_I$ on the main shaft 20, and the structure is such that when the first-speed clutch $C_I$ is actuated by hydraulic pressure to become engaged, the first-speed driving gear 26 rotates solidly with the main shaft 20, and when the second-speed clutch $C_2$ is actuated by hydraulic pressure to become engaged, the second-speed driving gear 24 and the reverse driving gear 25 rotate solidly with the main shaft 20.

A final driving gear 32, a third-speed clutch $C_3$, a spline S and a first-speed driven gear 36 provided with a one-way clutch 37 are fixed rearward in that order on countershaft 30 disposed in parallel with main shaft 20. Further, third-speed driven gear 38 engaging with the third-speed driving gear 22, second-speed driven gear 34 engaging with the second-speed driving gear 24 and a reverse driven gear 35 receiving a driving force from reverse driving gear 25 through idling gear I are provided rotatably with countershaft 30 between third-speed clutch $C_3$ and the first-speed driven gear 36 on countershaft 30. Further, second-speed driven gear 34 and the reverse driven gear 35 are coupled to the spline S selectively by a selector hub H.

One-way clutch 37 is capable of relieving a shock at the time of shifting from first gear to second gear, and thus a driving force of the first-speed driving gear 26 is transmitted to the countershaft 30 side by an action of the one-way clutch 37 through the first-speed driven gear 36, however, a turning force on the countershaft 30 side is not transmitted to the first-speed driving gear 26, and thus an engine brake through the first-speed driven gear 36 will be inoperative. Further, when the third-speed clutch $C_3$ is actuated by hydraulic pressure to become engaged, then third-speed driven gear 38 rotates solidly with the countershaft 30.

The final driving gear 32 engages with a gear 40, and a driving force of the gear 40 is transmitted to a left front wheel $W_L$ and a right front wheel $W_R$, thereby rotating and driving the left front wheel $W_L$ and the right front wheel $W_R$.

The first-, second- and third-speed clutches $C_1$, $C_2$, and $C_3$ each constitute a friction engaging member of this invention.

Next, the operation of a driving force transfer system shown in FIG. 1 will be described.

First, when the first-speed clutch $C_1$ is engaged, an output of the torque converter 10 is transferred to the left front wheel $W_L$ and the right front wheel $W_R$ through main shaft 20, first-speed clutch $C_1$, first-speed driving gear 26, first-speed driven gear 36, countershaft 30, gear 40 and differential gear 42, thereby rotating and driving the left front wheel $W_L$ and the right front wheel $W_R$ through first gear.

Then, when the second-speed clutch $C_2$ is engaged, the output of torque converter 10 is transferred to second-speed driving gear 24 and reverse driving gear 25 through main shaft 20 and second-speed clutch $C_2$. In this case, where the selector hub H is moved to second-speed driven gear 34, the driving force of second-speed driving gear 24 is transferred to countershaft 30 through second-speed driven gear 34, selector hub H, and spline S, thereby rotating and driving the left front wheel $W_L$ and the right front wheel $W_R$ through second gear. In this case, if the first-speed clutch $C_1$ is kept engaged by the action of one-way clutch 37, the rotation of countershaft 30 will not interfere with a rotation of first-speed driving gear 26.

Then, when the second-speed clutch $C_2$ is kept engaged and the selector hub H is moved to reverse driven gear 35, the output of the torque converter 10 is transferred to countershaft 30 through the main shaft 20, second-speed clutch $C_2$, reverse driving gear 25, idling gear I, reverse driven gear 35, selector hub H and spline S, thereby reversing left front wheel $W_L$ and right front wheel $W_R$.

Further, when second-speed clutch $C_2$ is disengaged and third-speed clutch $C_3$ is engaged, the output of torque converter 10 is transferred to countershaft 30 through main shaft 20, third-speed driving gear 22, third-speed driven gear 38 and third-speed clutch $C_3$, thereby rotating left front wheel $W_L$ and right front wheel $W_R$.

Figure 2:
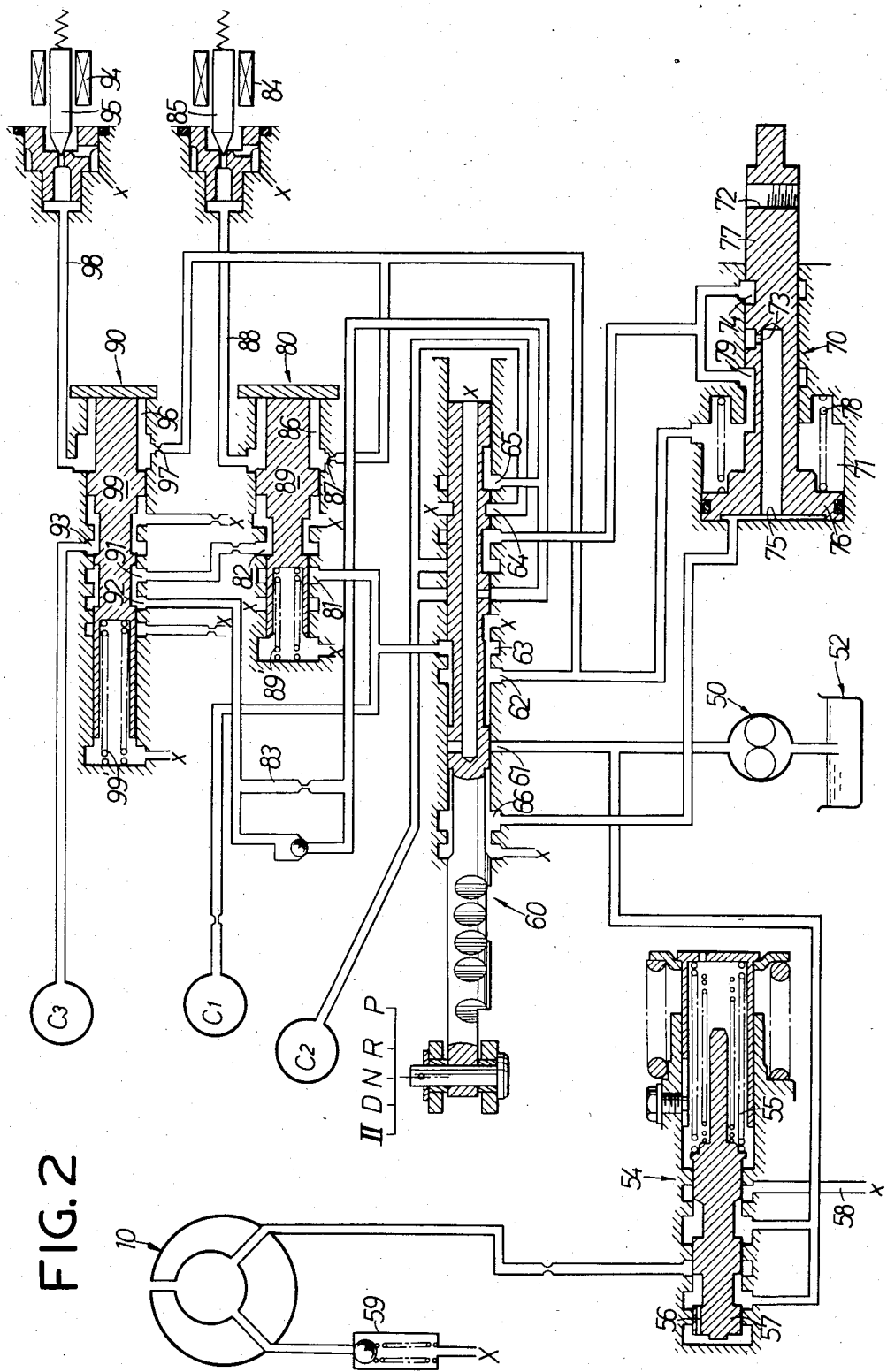
FIG. 2 is an oil hydraulic circuit diagram representing one example of a hydraulic control unit for controlling an operation of the transmission of FIG. 1.

FIG. 2 represents one example of a hydraulic control unit for actuating first-speed clutch $C_1$, second-speed clutch $C_2$, third-speed clutch $C_3$ and selector hub H of FIG. 1 by hydraulic pressure.

Hydraulic fluid is fed under pressure through an oil tank 52 by hydraulic pressure source pump 50 driven from spline 13 which rotates solidly with the pump wheel 12 of the torque converter 10 of FIG. 1. This pressurized hydraulic fluid is fed first to a known pressure regulating valve 54 and a hand valve 60.

In the pressure regulating valve 54, a spool 57 regulates a pressure of the hydraulic fluid fed from the hydraulic pressure source pump 50. The proper pressure is maintained at all times according to the pressure of the hydraulic fluid introduced to the end wall side of spool 57 by way of throttle 56 formed on spool 57 and the force of spring 55. Regulating valve 54 feeds the regulated hydraulic fluid to torque converter 10, and also feeds surplus oil back to the oil tank 52 through an oil purging path 58. Then, purged oil of torque converter 10 is fed back to oil tank 52 through check valve 59.

When hand valve 60 is set in a neutral position N as shown in FIG. 2, pump port 61 is kept blocked, and all ports other than pump port 61 of the hand valve 60 communicate with oil tank 52.

When hand valve 60 is moved leftward to come to the forward position D in FIG. 2, pump port 61 communicates with port 62 and port 63. The hydraulic fluid having passed port 62 is fed into a piston room 71 of servo actuator 70, is additionally fed into oil chamber 86 through a throttle 87 of first shift valve 80 and also fed into oil chamber 96 through a throttle 97 of second shift valve 90.

In the servo actuator 70, the piston 76 is biased leftward in FIG. 2 by a pressure of the hydraulic fluid introduced into piston room 71 and a force of a spring 78, an actuating rod 77 solid with the piston 76 is biased leftward accordingly, and thus a shift fork (not illustrated) which is coupled to tapped hole 72 formed on a tip of the actuating rod 77 moves the selector hub H of FIG. 1 to the second-speed driven gear 34 side. In this case, the hydraulic fluid going toward hand valve 60 from a port 79 has its course interrupted by hand valve 60, which is set at the forward position D.

In the first shift valve 80, a spool 89 is biased rightward at all times in FIG. 2 by a spring 89', and when a poppet valve 85 (operated by solenoid 84) interrupts feedback path 88 upon the deenergization of solenoid 84, the hydraulic fluid pressurized in the oil chamber 86 moves spool 89 leftward in Fig. 2 against a force of the spring 89'. When poppet valve 85 releases the feedback path 88 upon the energization of solenoid 84, the hydraulic fluid in oil chamber 86 is discharged to oil tank 52 through feedback path 88, and thus spool 89 is moved rightward in FIG. 2 by the force of spring 89'.

In the second shift valve 90, a spool 99 is biased rightward at all times in FIG. 2 by a spring 99'. When poppet valve 95 (operated by solenoid 94) interrupts feedback path 98 upon the deenergization of solenoid 94, the hydraulic fluid pressurized in oil chamber 96 moves the spool 99 leftward in Fig. 2 against a force of the spring 99'. Alternatively, when poppet valve 95 releases the feedback path 98 upon the energization of solenoid 94, the hydraulic fluid in oil chamber 96 is discharged to oil tank 52 through the feedback path 98, and thus the spool 99 is moved rightward in FIG. 2 by the force of the spring 99'.

The hydraulic fluid having passed the port 63 is fed to first-speed clutch $C_1$ by way of a throttle before first-speed clutch $C_1$ to engage first-speed clutch $C_1$ and is also fed to a port 81 of first shift valve 80. In this case, upon the energization of solenoid 84, the spool 89 moves rightward as illustrated to block port 81, and thus only the first-speed clutch $C_1$ is engaged, thereby selecting first gear.

Where the hand valve 60 is set at the forward position D and solenoid 84 is de-energized, the spool 89 is moved leftward in FIG. 2 by pressure in the oil chamber 86, thus allowing port 81 to communicate with port 82, and the hydraulic fluid fed to the port 81 is further fed to a port 91 of the second shift valve 90 by way of the port 82. In this case, upon the energization of solenoid 94, the spool 99 moves rightward as illustrated, and the port 91 is kept in communication with the port 92. Consequently, the hydraulic fluid having reached the port 91 is further fed to the port 65 of the hand valve 60 by way of a port 92 and an oil groove 83 provided with a throttle halfway in between. Then, when hand valve 60 is set at the forward position D, both the ports 65 and 64 are in communication with each other, the hydraulic fluid having reached the port 65 is fed further to the second-speed clutch $C_2$ by way of the port 64, and second gear is selected by keeping the second-speed clutch $C_2$ engaged.

Where the hand valve 60 is set at the forward change position D and solenoid 84 is de-energized, and solenoid 94 is also de-energized, the spool 99 is moved leftward in FIG. 2 by the hydraulic pressure in the oil chamber 96. Thus the port 92 comes to communicate with the oil tank 52, and the flow of the hydraulic fluid to the second-speed clutch $C_2$ is stopped. Port 91 then communicates with the port 93, causing the hydraulic fluid fed to the port 91 to flow to third-speed clutch $C_3$ by way of the port 93, thus causing third-speed clutch $C_3$ to become engaged, and by keeping the third-speed clutch $C_3$ engaged, third gear is selected.

When the hand valve 60 is further moved leftward in Fig. 2 and set at the second-speed holding position II, pump port 61 communicates only with port 62, and port 63 is interrupted from communication with pump port 61. Accordingly, the hydraulic fluid fed from the hydraulic pressure source pump 50 reaches port 79 by way of pump port 61, port 62 and piston room 71 of the servo actuator 70. However, since port 79 is kept communicating with the port 64 of the hand valve 60, the hydraulic fluid having reached the port 79 is fed further to the second-speed clutch $C_2$ by way of the port 64 to cause the second-speed clutch $C_2$ to become engaged, thus selecting second gear.

When hand valve 60 is set in the rear position R, pump port 61 communicates with port 66. The hydraulic fluid fed from hydraulic pressure source pump 50 is fed to the head side oil chamber 75 of the piston 76 of the servo actuator 70. The piston 76 is thus moved rightward in FIG. 2 against the force of the spring 78, therefore moving selector hub H of FIG. 1 to the reverse driven gear 35 by way of a shift fork (not illustrated) which is coupled to the tapped hole 72. Port 73 on the actuating rod 77 communicates with port 74, and since port 74 is kept in communication with port 64 of the hand valve 60, the hydraulic fluid fed to the head side oil chamber 75 of the piston 76 is fed to the second-speed clutch $C_2$ by way of port 73, port 74 and port 64 to cause the second-speed clutch $C_2$ to become engaged, thus selecting reverse gear.

When the hand valve 60 is set in the position P, pump port 61 is blocked, and neither the first-speed clutch $C_1$, the second-speed clutch $C_2$ or the third-speed clutch $C_3$ will be engaged.

Figure 3:
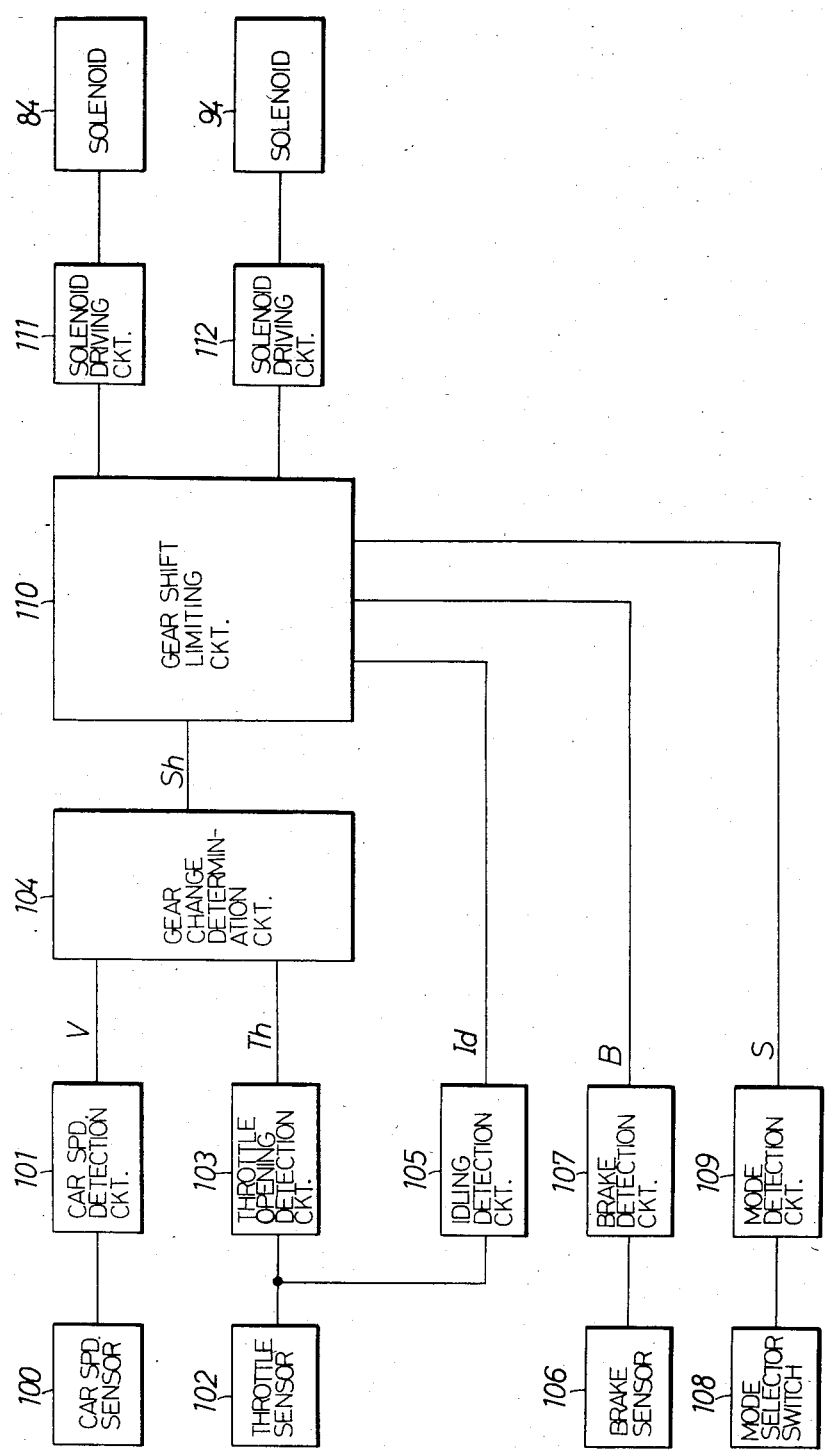
FIG. 3 is a block diagram representing one example of an electric control unit for controlling an operation of the hydraulic control unit of FIG. 2.
Figure 4:
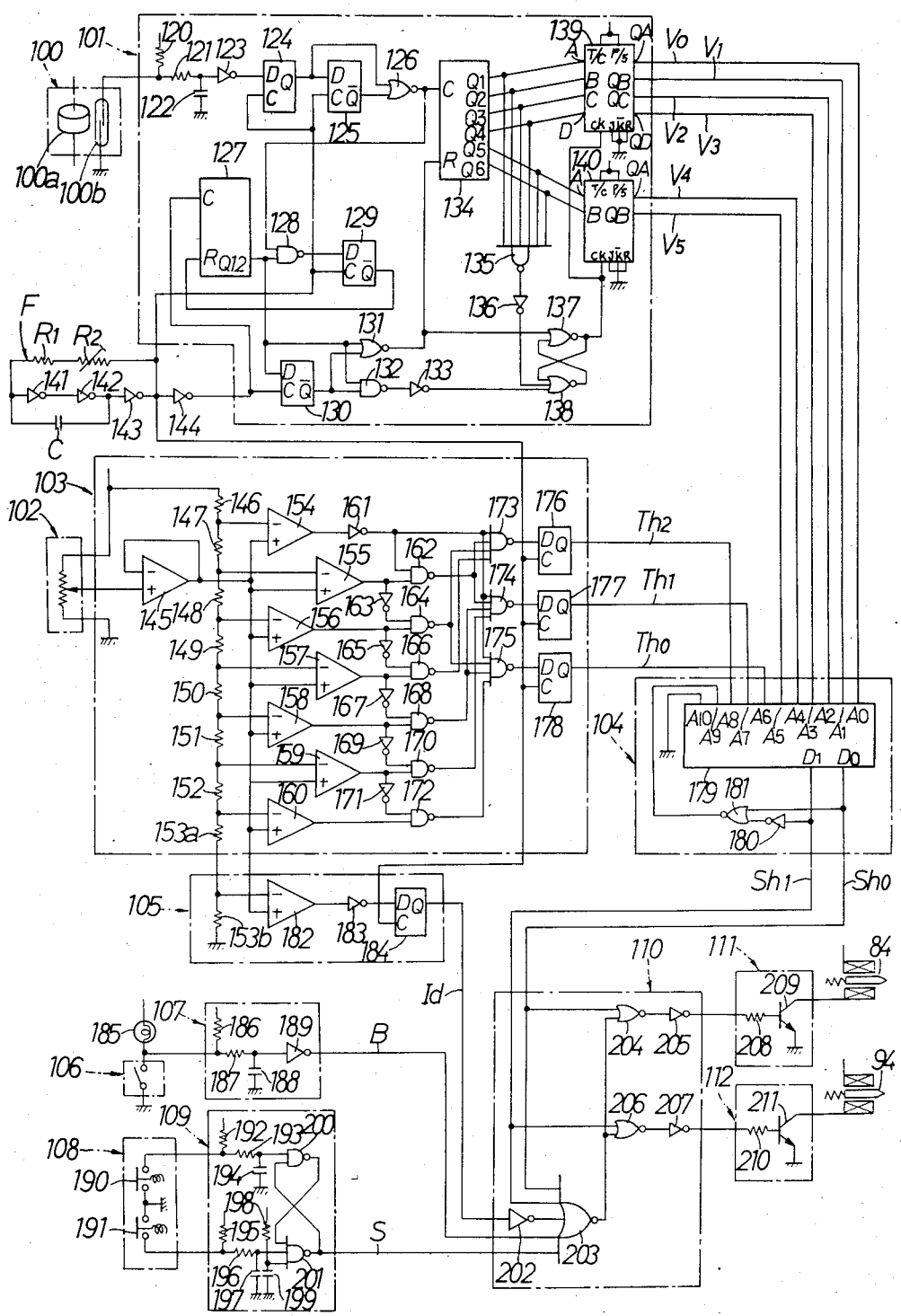
FIG. 4 is a schematic diagram representing an example of the electric control unit of FIG. 3.

FIG. 3 and FIG. 4 represent one example of the circuit for controlling the operation of solenoids 84, 94 of FIG. 2 according to this invention.

In FIG. 3, first, a car speed detection circuit 101 generates a car speed signal v corresponding to the car speed upon receipt of an output signal of a car speed sensor 100 and sends the car speed signal v to a change step decision circuit (hereinafter called a gear change determination circuit) 104. A throttle opening detection circuit 103 generates a throttle opening signal Th corresponding to a throttle opening upon receipt of an output signal from a throttle sensor 102 and sends the throttle opening signal Th to the gear change determination circuit 104. The gear change determination circuit 104 generates a shift signal Sh according to the car speed and the throttle opening upon receipt of the car speed signal v and the throttle opening signal Th and sends the shift signal Sh to a gear shift limiting circuit 110.

An idling detection circuit 105 generates an idling signal Id, upon receipt of an output signal from the throttle sensor 102, when detecting that the throttle valve is placed at an idling position. The idling signal Id is then sent to the gear shift limiting circuit 110.

A brake detection circuit 107 generates a brake signal B only during braking upon receipt of an output signal from a brake sensor 106. The brake signal B is then sent to the gear shift limiting circuit 110.

A mode detection circuit 109 generates a mode signal S according to a set state or a reset state upon receipt of an output signal of a mode selector switch 108 consisting of a set switch 190 and a reset switch 191 as shown in FIG. 4. The mode signal S is then sent to the gear shift limiting circuit 110. The mode selector switch 108 can be operated manually, and also reset automatically regardless of the state in which it has been set or reset, when a firing power supply is connected or an ignition switch turned on.

The above brake sensor 106, brake detection circuit 107, mode selector switch 108 and mode detection circuit 109 together constitute an operation transfer control system.

When the idling detection circuit 105 is kept from generating idling signal Id, or the brake detection circuit 107 generates the brake signal B, or the mode detection circuit 109 generates a reset signal as the mode signal S, the gear shift limiting circuit 110 operates according to the shift signal Sh only and sends a control signal to a solenoid driving circuit 111 for controlling the energization of solenoid 84 and a solenoid driving circuit 112 for controlling the energization of solenoid 94.

In this case when the shift signal Sh requests first gear, solenoids 84 and 94 are energized; when the shift signal Sh requests second gear, solenoid 84 is not energized and solenoid 94 is energized; when the shift signal Sh requests third gear, neither solenoid 84 nor solenoid 94 is energized.

On the other hand, when the idling detection circuit 105 generates the idling signal Id, the brake detection circuit 107 is kept from generating the brake signal B, and the mode detection circuit 109 generates a set signal as the mode signal S. The gear shift limiting circuit 110 allows both the solenoids 84, 94 to be energized regardless of the shift signal Sh, thus selecting first gear. The idling detection circuit 105 then constitutes a main part of the coasting detection circuit.

FIG. 4 represents one example of a circuit diagram of FIG. 3 which is more concrete and particular. The car speed sensor 100 is provided with a magnet 100a mounted on the speedometer cable and a lead switch 100b fixed in the neighborhood of the magnet 100a. The lead switch 100b generates a pulse signal according to rotations of the speedometer cable, and the pulse signal is sent to the car speed detection circuit 101.

The car speed detection circuit 101 is constituted of a flip-flop circuit comprising resistors 120, 121, capacitor 122, inverter 123, flip-flop circuits 124, 125, NOR gate 126, counter 127, NAND gate 128, flip-flop circuits 129, 130, NOR gate 131, NAND gate 132, inverter 133, counter 134, NAND gate 135, inverter 136, NOR gates 137 and 138, and converters 139 and 140, and is connected to an oscillator F comprising resistor $R_1$, variable resistor $R_2$, inverters 141 and 142, and capacitor C through a circuit including inverters 143 and 144. Speed detection circuit 101 counts a pulse number per constant time of the pulse signal sent from the car speed sensor 100, and outputs the pulse number in the form of 6-bit digital signals $v_0, v_l, v_2, v_3, v_4, v_5$.

The throttle sensor 102 can be shown as a potentiometer connected to a throttle valve shaft (not illustrated) of an engine E and rotating together with the throttle valve shaft. The throttle opening detection circuit 103 actuated according to an output signal of the throttle sensor 102 is constituted of amplifier 145, resistors 146, 147, 148, 149, 150, 151, 152, 153a, comparators 154, 155, 156, 157, 158, 159, 160, inverters 161, 163, 165, 167, 169, 171, NAND gates 162, 164, 166, 168, 170, 172, 173, 174, 175, flip-flop circuits 176, 177, 178, and outputs 3-bit digital signals $Th_0, Th_l, Th_2$ according to the throttle opening. Then, the relationship between the throttle opening and the output signals $Th_0, Th_l, Th_2$ can be made non-linear by selecting suitable values of the resistors 146, 147, ..., 152.

The idling detection circuit 105 is constituted of resistor 153b, comparator 182, inverter 183 and flip-flop circuit 184. It provides the idling signal Id as a high-level signal when the throttle valve is in the idling position.

The gear change determination circuit 104 is constituted, for example, of memory element 179, inverter 180, and NOR gate 181. The car speed signals $v_0, v_l, v_2, v_3, v_4, v_5$ which are output signals from the car speed detection circuit 101 are provided to lower 6 bits $A_0, A_l, A_2, A_3, A_4, A_5$ of the address line of the memory element 179 respectively, and the opening signals $Th_0, Th_l, Th_2$ which are output signals from the throttle opening detection circuit 103 are provided to bits $A_6, A_7, A_8$ respectively.

The shift signals $Sh_0, Sh_1$ are provided from terminals $D_0, D_1$ of the data line of the memory element 179 respectively. These shift signals $Sh_0, Sh_1$ are sent to the gear shift limiting circuit 110 and also input to a bit $A_9$ of the address line of the memory element 179 through a circuit comprising inverter 180 and NOR gate 181. In accordance as the shift signals $Sh_0, Sh_1$ are input to the bit $A_9$ through the circuit comprising inverter 180 and NOR gate 181, there may arise a hysteresis effect in a shift characteristic. Bit $A_{10}$ is grounded and hence not used.

It is set that when the gear change determination circuit 104 chooses first gear, both the shift signals $Sh_0, Sh_1$ become high-level; when it chooses second gear, the shift signal $Sh_1$ becomes high-level, while the shift signal $Sh_0$ becomes low-level; when it chooses third gear, both the shift signals become low-level.

Figure 5:
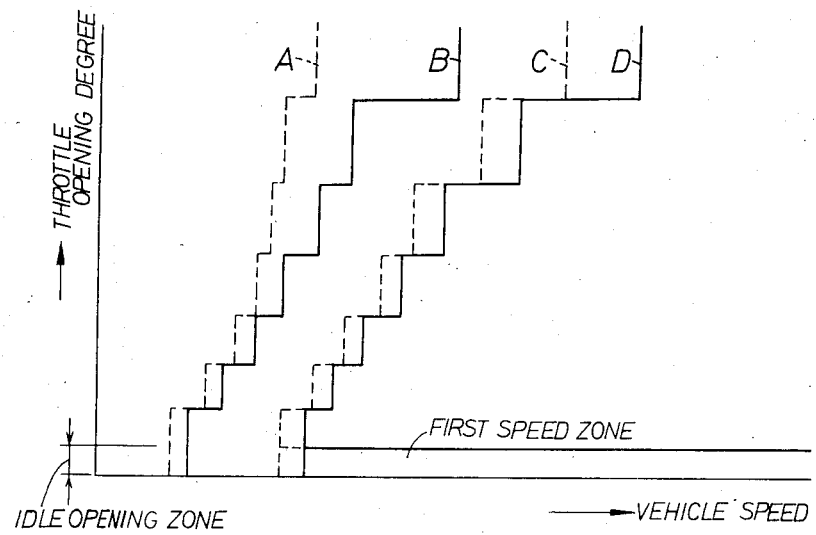
FIG. 5 is a diagram representing one example of a transmission characteristic according to the electric control unit of FIG. 4.

FIG. 5 is a diagram representing a shift characteristic by the gear change determination circuit 104. It is programmed that when the tenth bit $A_9$ of the memory element 179 is low-level, the left side of curve B of FIG. 5 works as a first speed zone the space between curve B and curve C works as a second speed zone, and the right side of curve C works as a third speed zone in accordance with the state of first to ninth bits $A_0, A_1, ..., A_8$ or the car speed and the throttle opening. When the tenth bit $A_9$ is high-level, the left side of the curve A works as the first speed zone, the space between curve A and curve D works as the second speed zone, and the right side of curve D works as the third speed zone.

Accordingly, for example, when first gear is shifted to second gear, the tenth bit $A_9$ of the memory element 179 is low-level as the shift signals $Sh_0, Sh_1$ are both high level, and thus the shift characteristic becomes that in which the gear is shifted according to curve B of FIG. 5. When the transmission is shifted to second gear beyond curve B, the shift signal $Sh_0$ becomes low-level, however, since the shift signal $Sh_1$ is high-level, the tenth bit $A_9$ becomes high level, and when second gear is shifted down to first gear, the gear change occurs according to curve A.

Then, when second gear is shifted to third gear, the tenth bit $A_9$ is kept at high level while in second gear, therefore the shift characteristic becomes that in which the gear change occurs according to curve D, and when the transmission shifts into third gear beyond curve D, the tenth bit $A_9$ becomes low-level as both the shift signals $Sh_0, Sh_1$ are low-level in this case, and when third gear is shifted down to second gear under the above state, the gear change occurs according to curve C.

The brake sensor 106 lights up a lamp 185 during braking and outputs a signal to the brake detection circuit 107. The brake detection circuit 107 is constituted of resistors 186, 187, capacitor 188, and inverter 189, and outputs the brake signal B as a high-level signal during braking.

The mode selector switch 108 is constituted of a set switch 190 and a reset switch 191 and sends its output signal to the mode detection circuit 109. The set switch 190 and the reset switch 191 are operative momentarily for manual operation and as so constituted come in a reset state automatically regardless of the state set or reset when a firing power supply is connected or an ignition switch is turned on.

The mode detection circuit 109 is constituted of resistors 192, 193, capacitor 194, resistors 195, 196, capacitor 197, resistor 198, capacitor 199, NAND gates 200, 201. The mode detector circuit 109 outputs a low-level mode signal S when the mode selector switch 108 is kept in a set state and the high-level mode signal S when the mode selector switch 108 is kept in a reset state.

The gear shift limiting circuit 110 is constituted of inverter 202, NOR gates 203, 204, inverter 205, NOR gate 206, and inverter 207. The shift signal $Sh_1$ is applied to NOR gates 206 and 203, while the shift signal $Sh_0$ is applied to NOR gates 204 and 203. The idling signal Id is then applied to NOR gate 203 through inverter 202. Further, the brake signal B and the mode signal S are applied to NOR gate 203. The output signal of the NOR gate 203 is applied to NOR gates 204 and 206.

The output signal of inverter 205 controls the energization of solenoid 84 through the solenoid driving circuit 111 constituted of resistor 208 and transistor 209. The output signal of inverter 707 controls the energization of solenoid 94 through the solenoid driving circuit 112 constituted of resistor 210 and transistor 211.

When both the shift signals $Sh_0$ and $Sh_1$ are kept at high level, or the gear change determination circuit 104 chooses first gear, output signals of NOR gates 204 and 206 both become low-level, and thus output signals of inverters 205, 207 become high-level, therefore the solenoids 84 and 94 are both energized, and consequently only the first-speed clutch $C_l$ is energized.

When the shift signal $Sh_l$ becomes high-level or the gear change determination circuit 104 chooses second gear, while the shift signal $Sh_0$ becomes low-level, the output signal of NOR gate 204 becomes high-level regardless of the idling signal Id, the brake signal B or the mode signal S, but an output signal of NOR gate 206 becomes low-level, and thus an output signal of inverter 205 becomes low-level. However, the output signal of inverter 207 becomes high-level, and thus solenoid 84 is de-energized and only solenoid 94 is energized. Consequently, the first-speed clutch $C_1$ and the second-speed clutch $C_2$ are engaged, thus selecting second gear.

When both the shift signals $Sh_0$ and $Sh_1$ become low-level, or the gear change determination circuit 104 chooses third gear, and where at least one of the following conditions is satisfied: the car is not coasting, and the idling detection circuit 105 is kept from generating the idling signal Id, or the car is braking, and the brake detection circuit 107 outputs the brake signal B, or the mode selector switch 108 is kept in a reset state and the mode signal S is kept at high level; output signals of NOR gates 204, 206 become high-level, and thus output signals of inverters 205, 207 become low-level, therefore the solenoids 84, 94 are not energized, the first-speed clutch $C_1$ and the third-speed clutch $C_3$ are engaged consequently, thus selecting third gear.

On the other hand, when the shift signals $Sh_0$, $Sh_1$ both become a low level, or the gear change determination circuit 104 choses third gear, and where the car is coasting, and the idling detection circuit 105 generates the idling signal Id, the car is not braking, and the brake detection circuit 107 is not outputting the brake signal B, and further the mode selector switch 108 is placed in a set state and the mode signal S is kept at low level, output signals of NOR gates 204, 206 both become low-level. Therefore, the output signals of inverters 205, 207 thus become high-level and both the solenoids 84, 94 are energized. Thus, only the first-speed clutch $C_1$ is engaged, thereby selecting first gear.

In the above embodiment, each sensor and each circuit are not necessarily limited to those illustrated, and other arbitrary sensors and circuits can be employed subject to attaining the objects of this invention. For example, the car speed sensor can be used together with an auto-cruise sensor at the same time, and a signal can be extracted from a stop-run switch as an output signal from the brake sensor.

Figure 6:
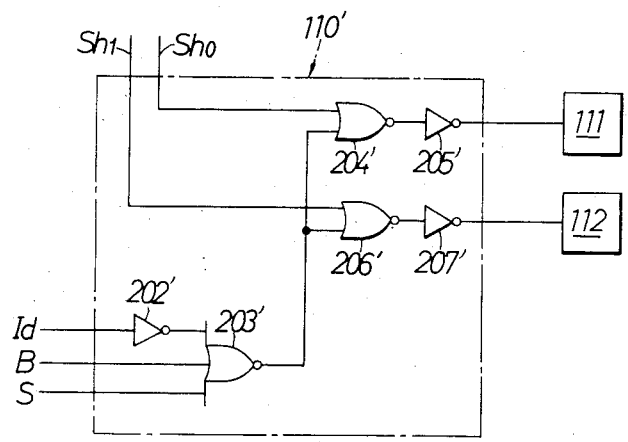
FIG. 6 is a schematic diagram representing another example of the gear shift limiting circuit shown in FIG. 4.

FIG. 6 represents a gear shift limitng circuit 110' which is another embodiment of the gear shift limiting circuit 110 of FIG. 4. In the gear shift limiting circuit 110', the shift signal $Sh_0$ is sent only to NOR gate 204' and the shift signal $Sh_1$ is sent only to NOR gate 206'; the idling signal Id is sent to NOR gate 203' through inverter 202' and the brake signal B and the mode signal S are sent to NOR gate 203'. An output signal of NOR gate 203' is sent to NOR gates 204' and 206'. An output signal of NOR gate 204' is sent to the solenoid driving circuit 111 through inverter 205', and an output signal of NOR gate 206' is sent to the solenoid driving circuit 112 through inverter 207'.

When both the shift signals $Sh_0$, $Sh_1$ are kept at high level, or the gear change determination circuit 104 chooses first gear, output signals of inverters 205', 207' become high-level regardless of the idling signal Id, the brake signal B or the mode signal S. Therefore, solenoids 84, 94 are both energized, and only the first-speed clutch $C_1$ remains engaged, thus selecting first gear.

When the shift signal $Sh_1$ becomes high-level, or the gear change determination circuit 104 chooses second gear, while the shift signal $Sh_0$ becomes low-level, and where at least one of the following conditions is satisfied: the idling detection circuit 105 is kept from generating the idling signal Id, or the brake detection circuit 107 outputs the brake signal B, or the mode selector switch 108 is kept in a reset state and the mode signal S is kept at high level; the output signal of inverter 207' becomes high-level, while the output signal of inverter 205' is low-level, solenoid 84 is energized and solenoid 94 is energized, the first-speed clutch $C_1$ and the second-speed clutch $C_2$ thus become engaged, and second gear is selected.

However when shift signal $Sh_1$ becomes high-level, or the gear change determination cirucit 104 chooses second gear, while the shift signal $Sh_0$ is low-level, and where the idling detection circuit 105 generates the idling signal Id, the brake detection circuit 107 is kept from generating the brake signal B, the mode selector switch 108 is placed in a set state and the mode signal S is kept at low level, output signals of inverters 205', 207'become high-level, both solenoids 84, 94 are energized, only the first-speed clutch $C_1$ is thus engaged, and therefore first gear is selected.

When the shift signals $Sh_0$, $Sh_1$ both become low-level, or the gear change determination circuit 104 chooses third-gear, and where at least one of the following conditions is satisfied: the idling detection circuit 105 is kept from generating the idling signal Id, or the brake detection circuit 107 outputs the brake signal B, or the mode selector switch 108 is kept in a reset state and the mode signal S is kept at high level; output signals of inverters 205', 207' become low-level, and since both solenoids 84, 94 are de-energized, the first-speed clutch $C_1$ and the third-speed clutch $C_3$ become engaged, and thus third gear is selected.

Then, when both the shift signals $Sh_0$, $Sh_1$ become low-level, or the gear change determination circuit 104 chooses third gear, and where the idling detection circuit 105 generates the idling signal Id, the brake detection circuit 107 is kept from outputting the brake signal B, and the mode selector switch 108 is placed under the set state and the mode signal S is kept at low level, output signals of inverters 205', 207' become high-level, both solenoids 84, 94 are energized, and only the first-speed clutch $C_1$ becomes engaged, thus first gear is selected.

Figure 7:
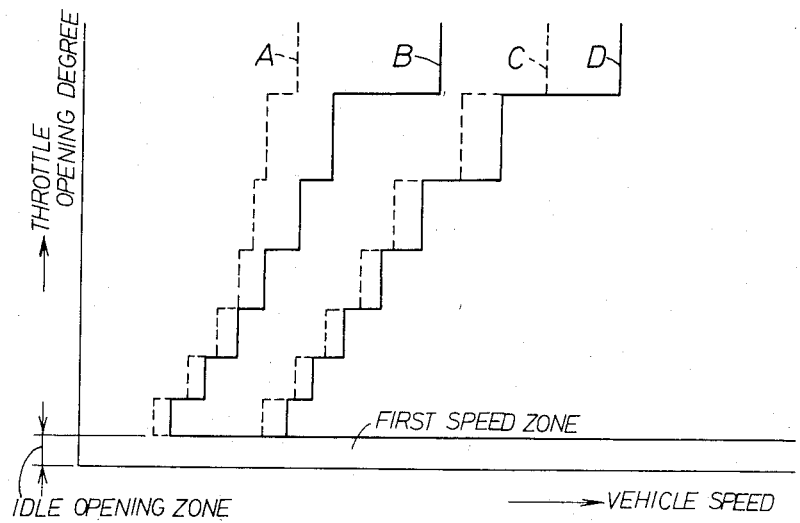
FIG. 7 is a transmission characteristic diagram representing a variation of the required transmission characteristic.

The illustrated embodiment indicates the case where a one-way clutch is provided only in the gear train for first gear of a forward three-speed shift transmission, however, the one-way clutch is not necessarily provided only in the gear train for first gear, and in, for example, a forward four-speed shift transmission or one with more gears, the one-way clutch can be provided in the gear train for second gear, or those for first gear and second gear, thereby shifting to the particular gear train provided with such one-way clutch during coasting. Then in the above embodiment, the gear shift control circuit 110 can be constituted so that the first gear can be selected regardless of car speed as shown in FIG. 7, when the idling detection circuit 105 outputs the idling signal Id.

According to this invention, as described above, a gear shift controller for automatic transmission is obtainable which comprises a coasting detection circuit for detecting a coasting state, and a gear shift limiting circuit for actuating only the gear train for the gear in which the one-way clutch is provided immediately regardless of the operation of the gear change determination circuit when the coasting detection circuit detects coasting, and therefore engine power can be cut off automatically by detecting the coasting state, thereby saving fuel.

Furthermore, an arrangement is such that an engine power system will be cut off during coasting by utilizing the one-way clutch provided in the gear train for a gear, therefore the construction is simplified, and the invention can be put into practice without making large changes to the construction of a conventional type of transmission.

Further, an operation transfer control system is provided for transferring operation of the gear shift limiting circuit, therefore a car can be driven with the engine braked without cutting off the engine power, if so desired by the driver, even during coasting.

According to this invention, furthermore, a one-way clutch provided in the gear train for low gear can be utilitized for cutting off an engine power system, and in such case, the number of times for shifting the transmission can be minimized in the process from a state of running in top gear to a stop, thereby lightening and moderating a shock to be exerted on passengers for shifting each time.

It is readily apparent that the above-described gear shift controller for automatic transmissions meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A gear shift controller for an automatic transmission having a gear shift, comprising:
   a hydraulic torque converter;
   a gear change group, having a plurality of gears, each gear providing a different transmission ratio for the transmission of power from said hydraulic torque converter to the output of the transmission, each of said gears comprising a gear train;
   a one-way clutch interposed in at least one of said gear trains;
   a plurality of clutch means operatively connected with said gear trains for actuating each of said gear trains selectively;
   a gear change determination circuit operatively connected with said clutch means to control the operation of each of said clutch means according to a predetermined gear-shifting program for engaging a gear train selected by the program;
   a coasting detection circuit for detecting a car in the coasting state;
   a gear shift limiting circuit, operatively connected with said gear change determination circuit and with said coasting detection circuit, for actuating only said gear train in which said one-way clutch is interposed immediately, regardless of the selected gear train and of the operation of said gear change determination circuit, when said coasting detection circuit has determined the car to be coasting; and
   an operation transfer control system including a brake operation detecting means and a mode selector switch means for transferring the operation of the gear shift limiting circuit, said operation transfer control system being adapted to stop, upon detection of one of said brake operation and a reset state of said mode selector switch, the operation of said gear shift limiting circuit and to place said plurality of clutch means under the control of said gear change determination circuit.

2. The gear shift controller of claim 1, wherein said operation transfer control system includes a brake detection circuit to detect if the car is braking.

3. The gear shift controller of claim 1, wherein said mode selector switch is associated with an engine starting means and serves for placing said plurality of clutch means under the control of said gear change determination circuit regardless of the state of said gear shift limiting circuit at the time of engine start-up.

4. The gear shift controller of claim 1, wherein said mode selector switch includes a manually selective transfer switch which controls whether the gear shift controlled state is enabled by said gear change determination circuit or by said gear shift limiting circuit.

5. The gear shift controller of claim 4, wherein said mode selector switch is provided with a reset switch for transferring said manually selective transfer switch automatically to said reset state so as to have the gear shift controlled state by said gear change determination circuit regardless of the state wherein said manually selective transfer switch has been set at the time of an engine start-up.

* * * * *